(No Model.)
D. H. COX, Jr.
TIRE REPAIRING DEVICE.
No. 566,562. Patented Aug. 25, 1896.
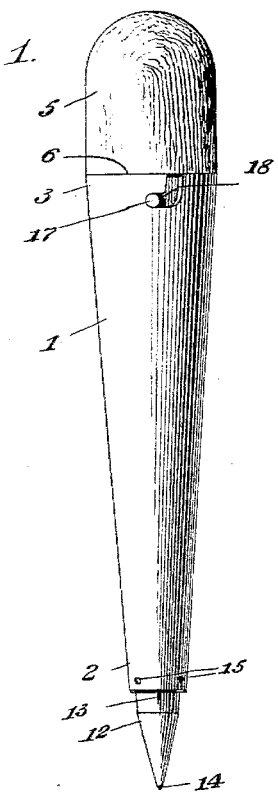
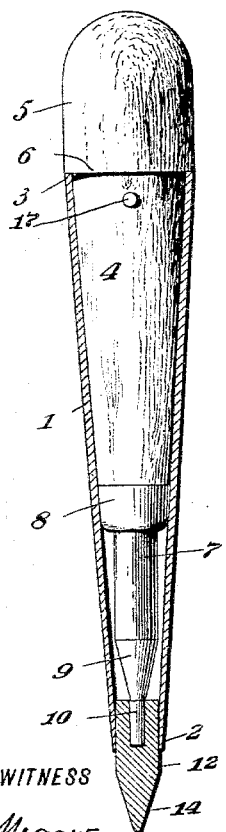
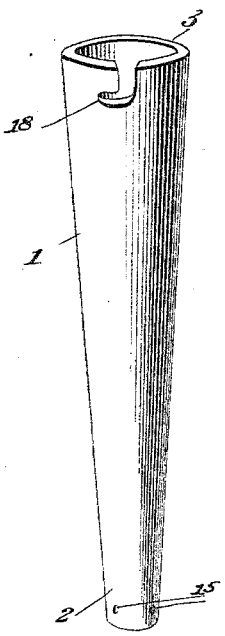
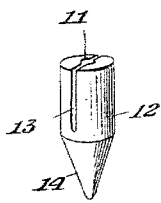
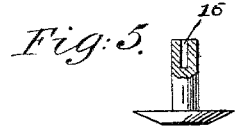
WITNESS
C. M. Megaw.
W. H. Fichtli
INVENTOR
David H. Cox, Jr.

UNITED STATES PATENT OFFICE.

DAVID H. COX, JR., OF ELIZABETH, NEW JERSEY.

TIRE-REPAIRING DEVICE.

SPECIFICATION forming part of Letters Patent No. 566,562, dated August 25, 1896.

Application filed January 30, 1896. Serial No. 577,371. (No model.)

*To all whom it may concern:*

Be it known that I, DAVID H. COX, Jr., a citizen of the United States, residing at Elizabeth, Union county, New Jersey, have invented certain Improvements in Tire-Repairing Devices, of which the following is a specification.

This invention relates to certain improvements in devices such as are employed for repairing the pneumatic tires of bicycles and similar vehicles, and has for its object to provide a device of this character of a simple and inexpensive nature, which shall be light and compact and shall be adapted for repairing tires in a convenient and rapid manner.

The invention consists in a tire-repairing device comprising a body and a conical sleeve fitting on and removable from the body, said device having a pointed end adapted for insertion in a puncture to be plugged, and said sleeve serving, when inserted in the punctured tire, as a conduit for the cement and the plug by means of which the tire is to be repaired.

The invention also contemplates certain other novel features of the construction and combinations and arrangements of the various parts of the improved tire-repairing device whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

In order that my improvements may be the better understood, I have illustrated in the accompanying drawings a tire-repairing device constructed in accordance with my invention, in which drawings—

Figure 1 is an elevation of the device complete; and Fig. 2 is a view similar to Fig. 1, but showing the conical sleeve of the device in section. Fig. 3 is a perspective view showing the conical sleeve detached, and Fig. 4 is a detached perspective view showing the removable point or cap of the body. Fig. 5 is a view showing a rubber tire-plug adapted for use in connection with my improved repairing device.

In the views, 1 indicates the sleeve of the device, which is, by preference, of metal and made tubular and conical, having one end 2 made smaller than its opposite end 3. This conical sleeve has imperforate sides, and in it is adapted to be inserted the body 4, which is of wood, by preference, also made conical, but having its larger end 5 enlarged to form a handle, at the base of which is formed an abrupt shoulder 6, adapted to engage the edges of the larger end 3 of the conical sleeve 1 when the body is inserted therein. At its smaller end the body 4 is provided with a rounded metal shank 7, secured in place by means of a ferrule 8. The end portion of the shank 7 is made tapered, as shown at 9 in Fig. 2, and at the base of said tapered end portion is formed a pin-like extension 10, of less diameter than the body portion 7 of the shank, but alined therewith and having a blunt or rounded point, as clearly shown in the drawings.

The extension 10 is adapted to fit in an aperture or recess formed axially in the end of a cap or point 12 of a diameter substantially the same as that of the shank 7, said aperture being shown at 11 in Fig. 4, and said cap 12 is split or transversely slotted at its upper portion, wherein the recess 11 is formed, as is clearly shown in Fig. 4, which is a detail view of this part. The sides of the cap 12, by reason of this slitted construction, act as springs to hold the cap securely in place on the reduced extension 10 of the shank.

The cap 12 is pointed, as shown at 14, at its end opposite to the aperture 11, and the proportions of the parts are such that when the body 4 is in place in the conical sleeve 1, with the shoulder 6 abutting on the edge of the sleeve at the larger end thereof, the pointed end 14 of the cap 12, when held on the reduced extension 10 of the shank, will protrude slightly beyond the smaller end 2 of the said sleeve. The point 14 of the cap 12 will of course be somewhat blunt. When the parts are in this position, as shown in Figs. 1 and 2, the pointed end 14 of the cap 12 may be inserted in the puncture in the tire, and the tool then pressed through the tire, being turned back and forth in the hand until the smaller end 2 of the sleeve shall have been worked through the tire, so as to be held therein by the elasticity of the material whereof the tire is composed. When this has been accomplished, the body 4 of the tool is removed from inside the sleeve, carrying with it the cap 12, and it will be seen that the sleeve forms a conduit through which a quantity of cement may be injected into the tire, sufficient to cement the plug therein. In order to hold the cement in place when poured into the sleeve, said sleeve will be pressed at its smaller end against the side of the tire opposite to the tread, and to permit the liquid cement to pass readily out into close contact with the inner side of the tire-tread I provide the sleeve 1, adjacent to its smaller end 2, with small lateral perforations 15, by preference three in number.

The cement having been poured into the sleeve, the rubber plug with which the repair is to be effected will be also placed inside the sleeve. By preference plugs such as that shown in Fig. 5 will be employed, each plug being formed with a recess or aperture 16 in its stem and adapted for the insertion of the reduced extension 10 of the shank, and in inserting the plug the extension 10 will be inserted into said aperture 16 and the plug held thereon will be pushed head first down through the sleeve 1. The cement in the sleeve 1 will act as a lubricant to facilitate the passage of the plug therethrough, and in this way plugs of different sizes may be inserted through the one sleeve, making the tool serviceable for effecting all ordinary repairs. The plug will be pushed through the sleeve 1 until its head protrudes through the smaller end 2 of the said sleeve and stands in position to bear against the inside surface of the tire around the puncture, after which the tool will be withdrawn, leaving the stem of the plug protruding outside the tire.

To permit the sleeve to be conveniently locked to the body, I prefer to provide at the larger end of the body a pin 17, in position to engage an L-shaped or bayonet slot 18 in the larger end 3 of the sleeve. In this way the parts are conveniently held together while not in use, and the body is permitted to be locked inside the sleeve in case it is desired to leave the tool standing in the tire after the plug has been inserted.

The device constructed as above described is extremely simple and inexpensive and is especially well adapted for use in repairing bicycle and similar pneumatic tires, since it is compact and light and of a form adapted to be conveniently carried in the pocket or tool-bag. It will also be obvious from the above description that the device is susceptible of considerable modification without material departure from its principles and spirit, and for this reason I do not wish to be understood as limiting myself to the precise form of the parts herein set forth.

Having thus described my invention, I claim—

1. A tire-repairing device comprising a conical sleeve, a body adapted for insertion therein and having a reduced extension, and a cap having a recess in one end adapted to receive the reduced extension of the body, said cap being adapted when the body is in place in the sleeve, to project beyond the smaller end of the sleeve, said cap having its projecting end pointed and adapted for insertion in a puncture to be plugged, and having its recessed end slotted transversely through its recess, substantially as set forth.

2. A tire-repairing device, comprising a conical sleeve, the larger end of which is provided with means for locking a handle therein, and the opposite end is provided with perforations, of a handle or body within the sleeve, the larger end of which is provided with means for locking it to the sleeve, and the opposite end is reduced, and a removable sharp-pointed block upon the reduced portion of the body and adapted to extend beyond the end of the sleeve, substantially as set forth.

In witness whereof I have hereunto signed my name in the presence of two subscribing witnesses.

DAVID H. COX, Jr.

Witnesses:
JOHN T. KERR,
JOHN W. APGAR.